Sept. 2, 1947.  W. R. BAILEY  2,426,583
FLEXOMETER TESTING DEVICE
Filed May 22, 1946  2 Sheets-Sheet 1

Inventor
WILLIAM R. BAILEY
By M. O. Hayes
Attorney

Sept. 2, 1947. W. R. BAILEY 2,426,583
FLEXOMETER TESTING DEVICE
Filed May 22, 1946 2 Sheets-Sheet 2

Inventor
WILLIAM R. BAILEY
M. A. Hayes
By
Attorney

Patented Sept. 2, 1947

2,426,583

UNITED STATES PATENT OFFICE 2,426,583

FLEXOMETER TESTING DEVICE

William R. Bailey, United States Navy,
Washington, D. C.

Application May 22, 1946, Serial No. 671,484

4 Claims. (Cl. 73—100)

(Granted under the act of March 3, 1883, as
amended April 30, 1928; 370 O. G. 757)

This invention relates to a flexometer and has for an object to provide an improved device for testing the bending properties and elastic limits of sheet material specimens, such as specimens of plastics, metals, pasteboard, or any other material, laminated or otherwise, which may be made in sheet form.

A further object of this invention is to provide a flexometer which can apply a controllable flexing or bending force to the specimen, and wherein the force can be accurately predetermined, and in addition, may be applied in as small variations as may be desired, thereby assuring extreme accuracy in the final results.

A further object of this invention is to provide a pressure operated flexometer wherein an accurately controllable pressure provides an accurately controllable force in flexing the specimen, thereby making it possible to accurately determine the initial elastic limit of the specimen in addition to the breaking limit when so desired, thus avoiding the use of weights which cannot be provided in such infinitely small variable amounts as when pressure force is used; for in adding weights, the very addition of another weight will cause an inaccuracy through the very act of adding the weight.

Still a further object of this invention is to provide a flexometer which measures the resiliency of a strip of sheet material, for determining the force necessary to bend the specimen through any desired angle, as well as for instantly or slowly releasing the applied force to determine the time, as by a stop watch, for instance, for the specimen to come back to its original position.

With the foregoing and other objects in view, the invention consists in the construction, combination and arrangement of parts hereinafter described and illustrated in the drawings in which.

Figure 1:
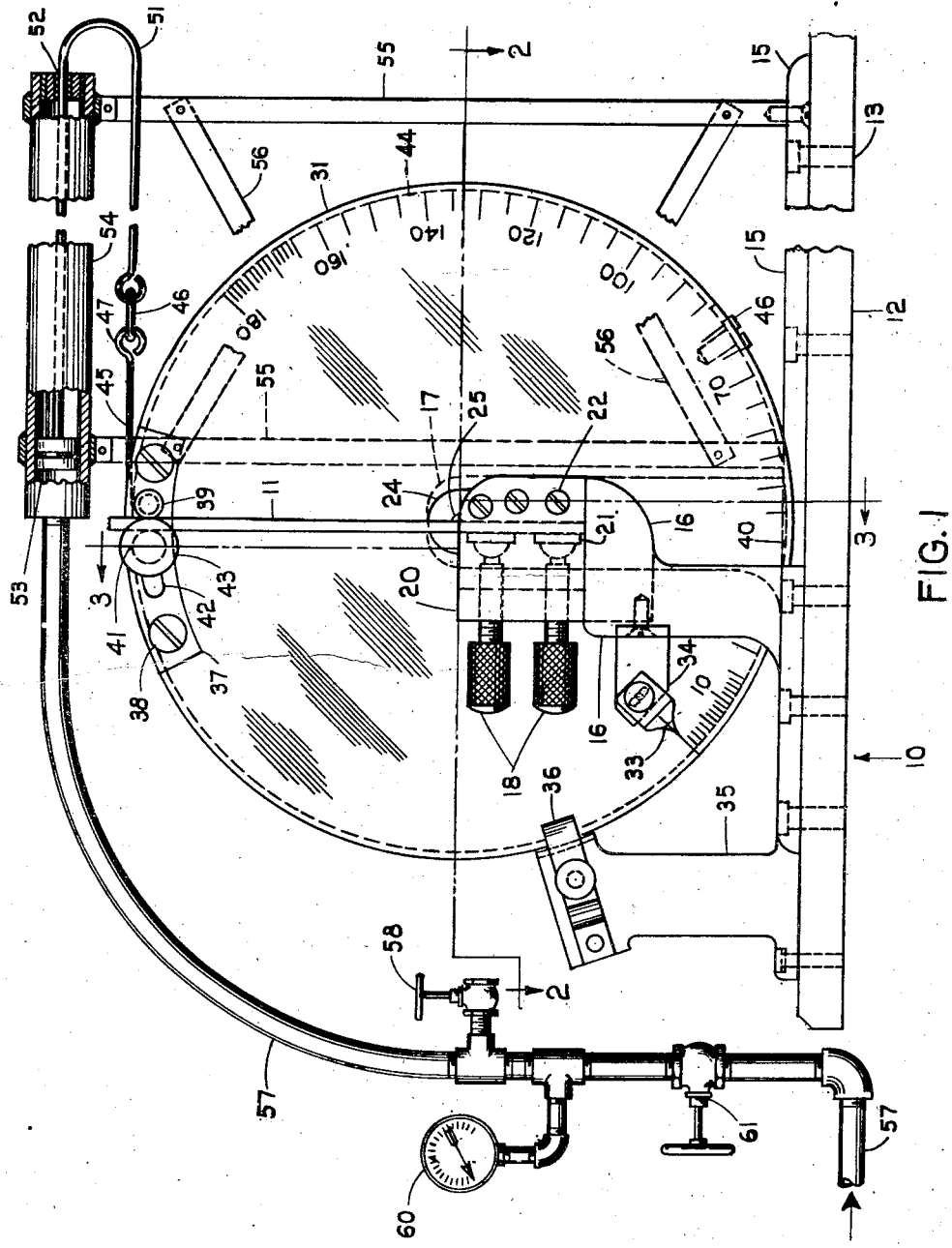
Fig. 1 is a plan view, partly broken away, of the flexometer of this invention.
Figure 2:
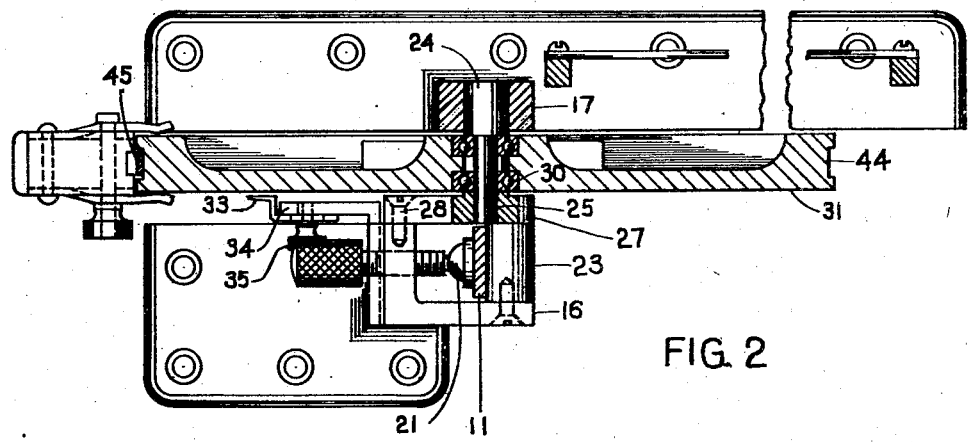
Fig. 2 is a sectional view on lines 2—2 of Fig. 1.
Figure 3:
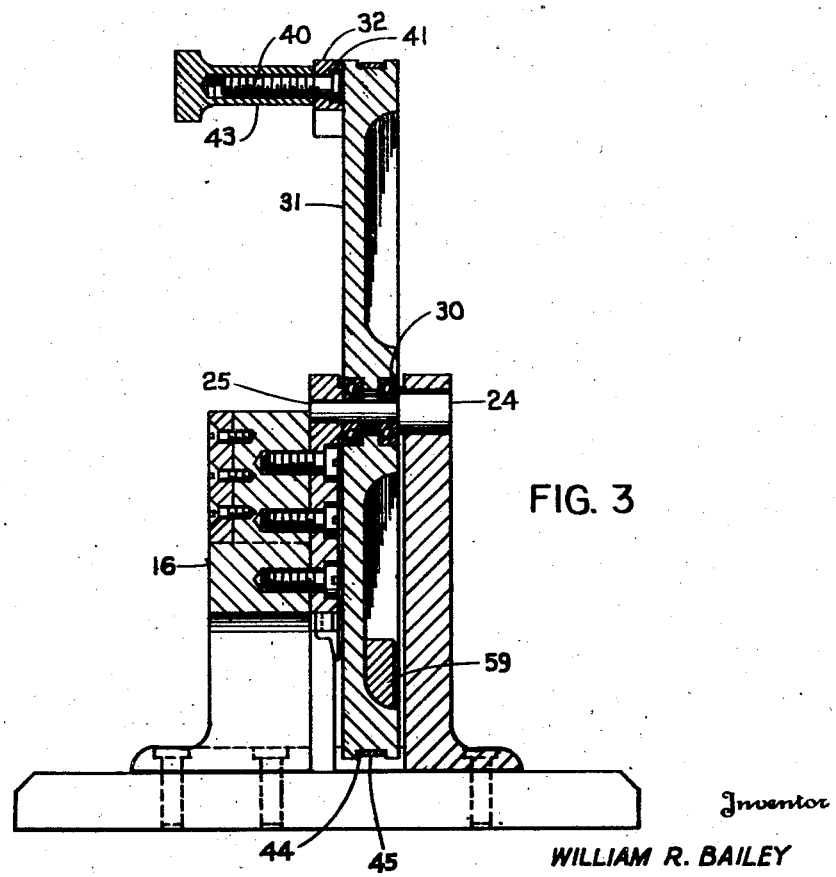
Fig. 3 is a sectional view on lines 3—3 of Fig. 1.

There is shown at 10 the flexometer of this invention for use in testing the resiliency, bendability, elastic limits and breaking strength of a specimen strip such as at 11 of any kind of sheet material, whether of plastic, metal, paste board, or any kind of natural or synthetic material. The flexometer 10 is mounted on a rigid base 12, as by stud screws 13, passing through the feet 14 and 15 of the specimen holding vise 16 and the disc shaft support 17.

The vise 16 includes a pair of thumb screws 18 threaded through an angle plate 20 and terminating in flattened tabs 21. The angle plate 20 is secured by screws 22 to one side of an anvil 23 in the vise 16 against which the screw tabs 21 will secure the specimen 11 and hold the specimen in an upright position.

Mounted in the support 17 is a shaft head 24 from which extends a shaft 25 whose end 26 is supported in a plate 27 secured by screws 28 to the back side of the anvil 23. Anti-friction bearings 30 on shaft 25 provide a journal for a disc 31, the face 32 of the disc 31 being graduated in degrees from zero to 180° as shown. A pointer 33 fastened on an arm 34 secured by a screw to the anvil 23 is set at the normal zero position of the disc 31 while a pedestal 35 mounted on the base 11 has a pair of disc embracing spring fingers 36 adapted to be tightened against the disc 31 to act as a holding brake when inserting the specimen 11.

It will be noted that the center of the shaft 25 coincides with the top edge of the face of the anvil 23 so that when the specimen 11 has its top end held by the disc 31, the specimen 11 starts to bend or flex at a point coinciding with the center of rotation of the disc. The means for holding the specimen 11 to the disc 31 consists of an arcuate plate 31 secured by screws 38 along the edge of the disc 31. A fixed stud 39 on arcuate plate 37 has its forward edge, against which the back of the specimen 11 abuts, directly above the center of rotation of the disc 31. The forward face of the specimen abuts against an arcuately adjustable stud 40 having a head 41 located in a countersunk arcuate slot 42 and secured thereto by tightening the threaded sleeve 43. This adjustability of the holding means on the disc 11 is necessary because the thickness of the specimen 11 varies according to the material being tested, while the length selected is preferably six inches and the width is one inch.

To provide an accurately controllable force for rotating the disc 31 and hence flexing or bending the specimen 11, the periphery of the disc 31 is countersunk as at 44 for receiving a metal tape 45 which is anchored thereto by stud screw 46. The other end 47 of metal tape 45 is linked at 48 to the turned back end 50 of a connecting rod 51 passing through a spider 52 to a piston 53 within a cylinder 54 mounted on two uprights 55 on the disc support feet 14 which are cross braced at 56.

A pressure line 57 feeds into the cylinder 54 on the other side of piston 53, and includes an exhaust valve 58, a pressure indicating gauge 60 and a control valve 61, the pressure to line 53 coming from any suitable source or supply. A counterweight 59 on the back of the disc 31 counterbalances the weight of the arcuate plate 37 and the specimen holding means thereon.

In operation, with the cylinder 54 being emptied of any pressure by the valve 58, the zero is brought under the pointer 33 and the holding brake fingers 36 is set by tightening the thumb nut thereon. The specimen 11, cut to the appropriate size and width, is set with one end in the vise 16 and the other end between the studs 38 and 40 on the disc 31, the adjustable stud 40 being brought into contact with the specimen 11. The control valve 61 is then operated to permit any desired amount of pressure to enter the cylinder 54 as measured and indicated by the gauge 60. Pressure in the cylinder 54 moves the piston 53 to apply an equal rotative force on the disc 31 and hence on the specimen 11. By suitably varying the pressure, the stiffness, brittleness, resiliency, flexibility, elastic yielding limit and breaking limits of the specimen can be measured and accurately ascertained. By utilizing a clock or stop watch, the fatigue induced in a specimen can be measured, as well as the time a specimen takes in returning to its original condition when the force has been released by means of the exhaust valve 58. As a result of the pressure system of applying the rotative force herein described, it is possible to accurately compare different specimens of the same or different materials when seeking a material having a desired stiffness or resiliency as well as desired elastic or breaking limits.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. A flexometer for testing the flexibility of sheet material specimens comprising a rotative disc provided with graduations, means for holding one end of a specimen against movement, means for holding the other end of the specimen to said rotative disc, a graduation cooperating pointer, and pressure actuated means for controllably applying any desired rotative force to said disc, said first holding means comprising a vise including an anvil and specimen holding tabs movable against the face of said anvil, the edge of said anvil face being located at the center of rotation of said disc, said second holding means comprising a stud fixed on said disc and having a specimen contacting face aligned with the anvil face when the disc is at the zero angle of rotation, and an arcuately adjustable stud adapted to hold against the opposite side of the specimen, and a disc holding releasable brake for holding the disc at zero while inserting the specimen.

2. A flexometer for testing the flexibility of sheet material specimens comprising a rotative disc provided with graduations, means for holding one end of a specimen against movement, means for holding the other end of the specimen to said rotative disc, a graduation cooperating pointer, and means for controllably applying any desired rotative force to said disc, said first holding means comprising a vise including an anvil and specimen holding tabs movable against the face of said anvil, the edge of said anvil face being located at the center of rotation of said disc, said second holding means comprising a stud fixed on said disc and having a specimen contacting face aligned with the anvil face when the disc is at the zero angle of rotation, and an arcuately adjustable stud adapted to hold against the opposite side of the specimen.

3. A flexometer for testing the flexibility of sheet material specimens comprising a rotative disc provided with graduations, means for holding one end of a specimen against movement, means for holding the other end of the specimen to said rotative disc, and pressure actuated means for controllably applying any desired rotative force to said disc, said first holding means comprising a vise including an anvil and specimen holding tabs movable against the face of said anvil, the edge of said anvil face being located at the center of rotation of said disc, said second holding means comprising a stud fixed on said disc and having a specimen contacting face aligned with the anvil face when the disc is at the zero angle of rotation, and an arcuately adjustable stud adapted to hold against the opposite side of the specimen, said pressure actuated means comprising a metal tape anchored about the periphery of said disc, a piston to which said tape is linked, a cylinder in which said piston operates, a pressure line to said cylinder, an exhaust line in said line, a pressure indicating gauge in said line and a pressure control valve in said line.

4. A flexometer for testing the flexibility of sheet material specimens comprising a rotative disc provided with graduations, means for holding one end of a specimen against movement, means for holding the other end of the specimen to said rotative disc, a graduation cooperating pointer, and pressure actuated means for controllably applying any desired rotative force to said disc, said first holding means comprising a vise including an anvil and specimen holding tabs movable against the face of said anvil, the edge of said anvil face being located at the center of rotation of said disc, said second holding means comprising a stud fixed on said disc and having a specimen contacting face aligned with the anvil face when the disc is at the zero angle of rotation, and an arcuately adjustable stud adapted to hold against the opposite side of the specimen, a disc holding releasable brake for holding the disc at zero while inserting the specimen, said pressure actuated means comprising a metal tape anchored about the periphery of said disc, a piston to which said tape is linked, a cylinder in which said piston operates, a pressure line to said cylinder, an exhaust line in said line, a pressure indicating gauge in said line and a pressure control valve in said line.

WILLIAM R. BAILEY.

REFERENCES CITED

The following references are of record in the file of this patent:

UNITED STATES PATENTS

| Number | Name | Date |
| --- | --- | --- |
| 2,063,275 | Taber | Dec. 8, 1936 |
| 2,092,809 | Masten | Sept. 14, 1937 |
| 1,829,969 | Smith | Nov. 3, 1931 |
| 2,049,235 | Tour et al. | July 28, 1936 |
| 2,131,805 | Lowe | Oct. 4, 1938 |

FOREIGN PATENTS

| Number | Country | Date |
| --- | --- | --- |
| 383,000 | Germany | Oct. 9, 1923 |